(No Model.) 2 Sheets—Sheet 1.
H. M. BYLLESBY.
ALTERNATE CURRENT AND STORAGE SYSTEM OF ELECTRICAL DISTRIBUTION.
No. 383,621. Patented May 29, 1888.
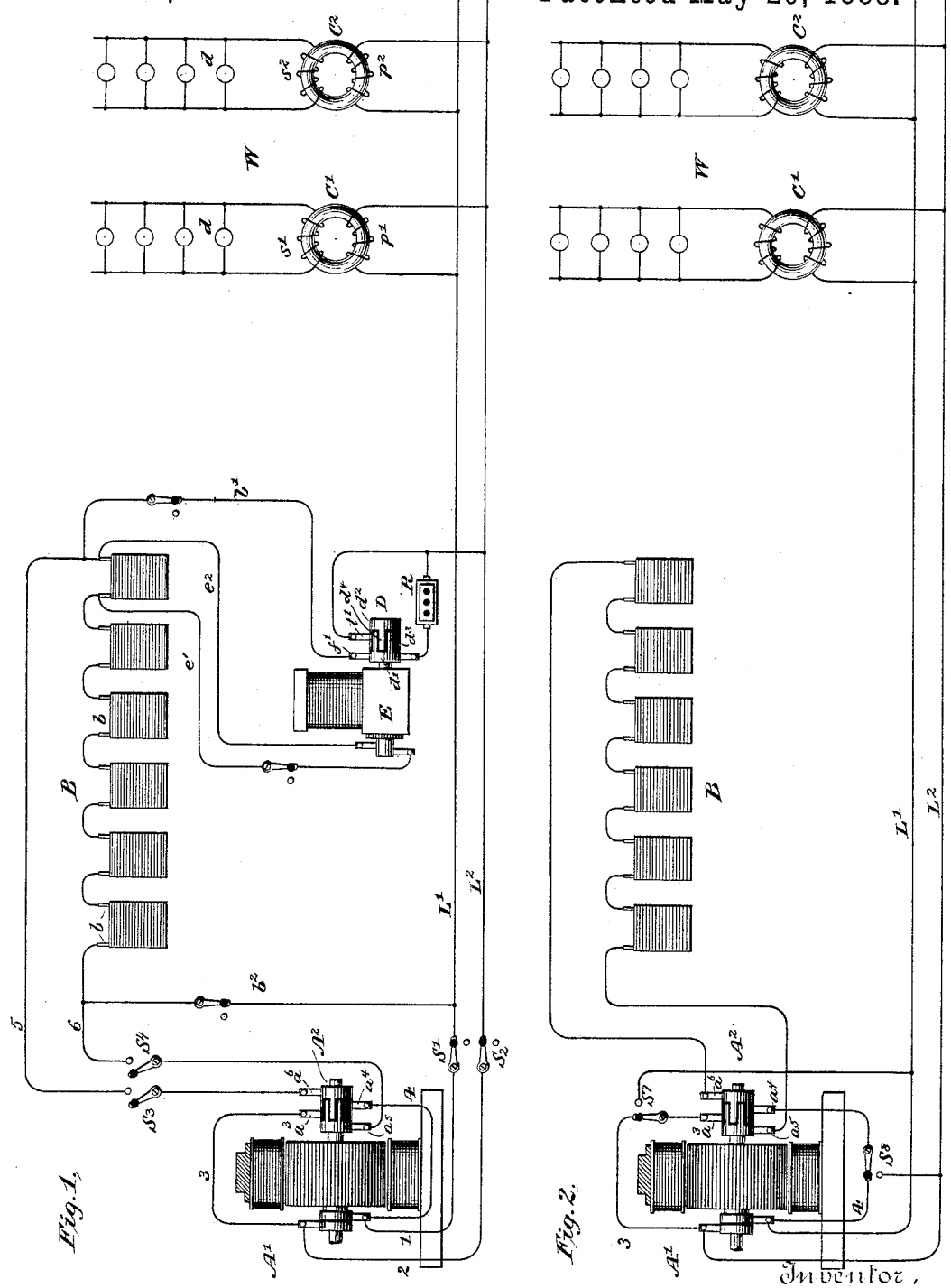
Witnesses.
Geo. W. Breck
Carrie E. Ashley
Inventor,
H. M. Byllesby.
By his Attorneys
Pope Edgcomb & Terry.

(No Model.) 2 Sheets—Sheet 2.
H. M. BYLLESBY.
ALTERNATE CURRENT AND STORAGE SYSTEM OF ELECTRICAL DISTRIBUTION.
No. 383,621. Patented May 29, 1888.
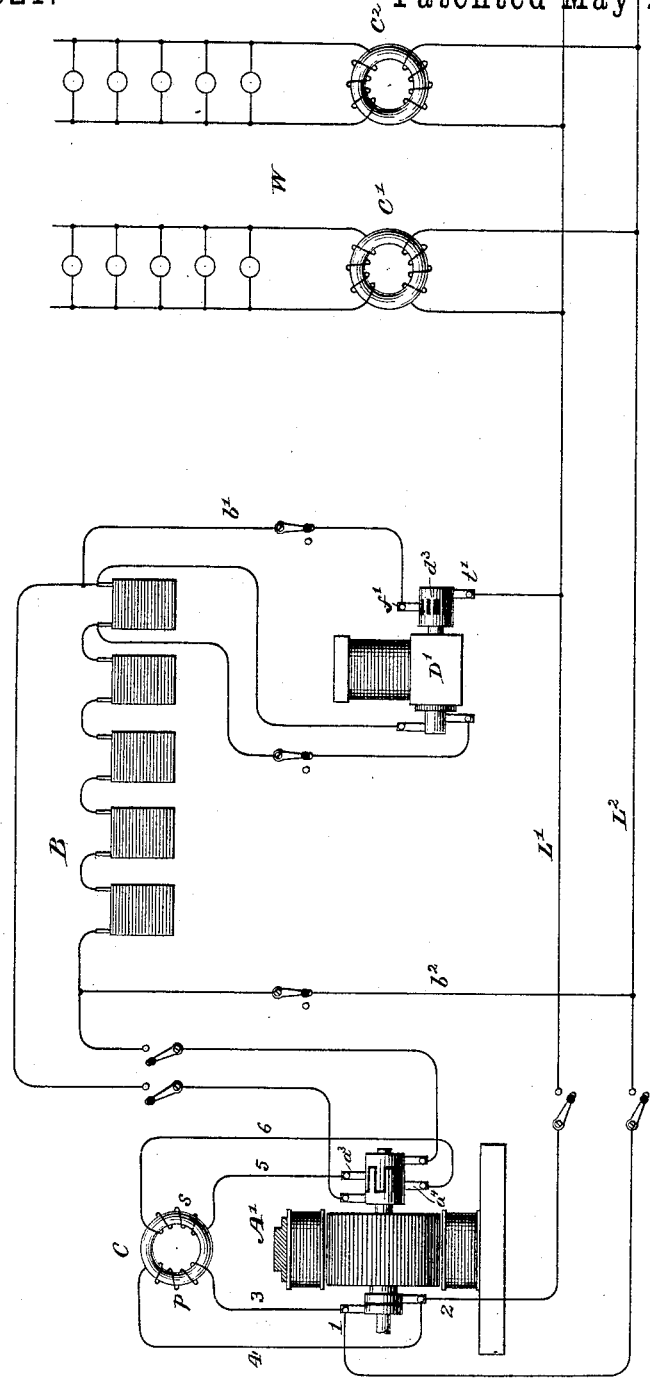
Witnesses,
Geo. W. Breck
Carrie E. Ashley
Inventor,
H. M. Byllesby.
By his Attorneys
Pope Edgecomb & Terry.

UNITED STATES PATENT OFFICE.

HENRY M. BYLLESBY, OF PITTSBURG, PENNSYLVANIA, ASSIGNOR TO THE WESTINGHOUSE ELECTRIC COMPANY, OF SAME PLACE.

ALTERNATE-CURRENT AND STORAGE SYSTEM OF ELECTRICAL DISTRIBUTION.

SPECIFICATION forming part of Letters Patent No. 383,621, dated May 29, 1888.

Application filed October 1, 1887. Serial No. 251,199. (No model.)

*To all whom it may concern:*

Be it known that I, HENRY M. BYLLESBY, a citizen of the United States, residing in Pittsburg, in the county of Allegheny and State of Pennsylvania, have invented certain new and useful Improvements in Combined Alternate-Current and Storage-Battery System of Electric Distribution, of which the following is a specification.

The invention relates to an organization of circuits and apparatus whereby a storage-battery may conveniently be employed in connection with a so-called "secondary" system of electric distribution and conversion for various useful purposes.

The special object of the invention is to provide means whereby a storage-battery may be employed when required as a substitute for or to assist the alternate-current generator in supplying the requisite currents to the converting and translating devices. This requires that means be provided for rectifying the current from the generator and delivering it to the storage-battery at such times as the full capacity of the source is not required for other purposes, and also a rheotome or circuit-controlling device by means of which the current from the storage-battery may be rendered intermittent, alternating, or pulsatory, as required, and delivered to the distributing system.

In the accompanying drawings there is illustrated, in Figure 1, a general organization of circuits and apparatus for carrying out the invention. Figs. 2 and 3 illustrate modifications.

Certain other organizations of storage-batteries and systems of electrical distribution are claimed in applications filed by me, Serial Nos. 251,198 and 251,200, of even date herewith, and Serial No. 265,265, filed February 25, 1888.

Referring to the figures, A' represents a source of alternating electric currents, and this may be any suitable well-known form of alternate-current electric generator. The respective poles of this source are normally connected by conductors 1 and 2 through switches S' and $S^2$ with the main lines L' and $L^2$ of a system of alternate-current electric distribution. The lines L' and $L^2$ are connected through the primary coils $p'$ and $p^2$ of electric converters C' and $C^2$, of suitable construction. The secondary coils $s'$ $s^2$ of these converters are connected with conductors leading to the translating devices $d$ $d$, which are here arranged in multiple arc.

Now it sometimes chances that in a system of distribution of this character short periods of time occur when it is desirable to employ more current than can be supplied by a generator which is at other times fully adequate to operate the system, and in other instances it may be desired to run the generator for a short time only and then store up or reserve a supply of electric energy for use at other times. For this purpose the storage-battery B is employed. This is arranged with any requisite number of elements, as shown at $b$ $b$, and it is provided with means for connection with the generator A'. Since this generator, however, normally delivers alternating electric currents, it is necessary to straighten or render continuous the currents delivered to the battery. For this purpose a rectifier, $A^2$, is employed. This may be carried upon the shaft of the generator A' or driven independently at the proper speed. Conductors 3 and 4 are led from the conductors 1 and 2 to brushes $a^3$ and $a^4$ of the rectifier. Collecting-brushes $a^5$ and $a^6$, applied to the rectifier, lead to switches $S^3$ and $S^4$. The switch-points $s^3$ and $s^4$ of the switches are connected by conductors 5 and 6 with the poles of the battery B, so that by opening the switches $s'$ and $s^2$ and closing the switches $s^3$ and $s^4$ direct electric currents may be delivered to the battery B for charging the same. In some instances it may not be necessary to deliver all the currents to the battery B, but the switches $s'$ and $s^2$ may be closed at the same time.

A conductor, $b'$, leads from one pole of the battery B to a rheotome or circuit-controller, D, through which currents may be delivered to the conductors L' and $L^2$, supplying the work-circuit W. This is required for the purpose of rendering the direct currents from the storage-battery of such character as to be capable of operating the converters, and through them the translating devices—that is to say, for changing the direct currents in this instance into pulsatory currents. The rheotome D here shown is adapted to revolve at a high rate of speed, being driven in any convenient manner—as, for instance, by an engine or by an electric motor, E, operated by currents derived from a portion of the storage-battery through the conductors $e'$ and $e^2$, or in any other convenient manner. The rheotome may consist of two rings or plates, $d'$ and $d^2$, having teeth or plates $d^3$ and $d^4$ alternating with each other. The conductor $b'$ is connected with one of these plates through a brush, $f'$, which rests continuously upon the ring $d'$. The line $L^2$ is connected with the brush $t'$, which makes alternate contact with the two plates through the alternating teeth. The plate $d'$ is connected with the plate $d^2$ or the line $L^2$ through an artificial resistance, R. The line $L'$ is connected with the other pole of the battery through a conductor, $b^2$. In this manner the battery will be connected with the line $L'$ $L^2$, first directly and then through a resistance, and a pulsatory current will be transmitted. This current will be converted into secondary or induced currents by the converters $C'$ and $C^2$. In this manner the translating devices may be operated by the energy derived from the battery B.

In case the currents are desired to assist the generator $A'$, it will be necessary that the changes in it should be synchronous or coincident with the changes in the current delivered by the generator. For this purpose it may be desirable to place the rheotome upon the shaft of the generator $A'$, as indicated in Fig. 2. The electric motor E will then be dispensed with. In this instance the rectifier $A^2$ serves as a rheotome for reversing the connections of the battery B coincident with the reversals in the direction of the current from the generator $A'$. For this purpose the conductors 3 and 4, leading from the poles of the generator $A'$, may be opened and the brushes $a^3$ and $a^4$ connected, respectively, with the conductors $L^2$ and $L'$ by switches $S^7$ and $S^8$. The alternations will then be synchronous and in unison with those of the generator.

In some instances the current delivered by the generator A may not be of the proper electro-motive force for charging the battery to the best advantage. In such a case it may be desired to employ a converter, C, Fig. 3, for transforming the currents as may be required. To this end the conductors 3 and 4, leading from the conductors 1 and 2, may be connected through the primary coils $p$ of the converter C, and the secondary coils $s$ are then connected with conductors 5 and 6, leading to the brushes $a^3$ and $a^4$ of the rectifier. The coils $p$ and $s$ are so proportioned as to transform the currents as may be required.

The current from the storage-battery may be made intermittent instead of alternating or pulsatory in the manner also shown in Fig. 3. In this instance connection from one pole of the storage-battery is made through the conductor $b'$ with the brush $f'$, applied to an interrupter, $D'$. The brush $t'$ is connected with the line $L'$. The other pole of the battery is connected by a conductor, $b^2$, with the line $L^2$. The interrupter $D'$ consists of a ring of conducting material having non-conducting surfaces $d^3$, which pass under the brush $f'$.

I claim as my invention—

1. The combination of a source of alternating electric currents, a current-rectifier connected therewith, a storage-battery supplied with currents through such rectifier, a system of electric distribution and conversion, a rheotome for transforming the currents from the storage-battery into alternating, pulsatory, or intermittent currents, and means for discharging said battery into said system through said rheotome.

2. The combination, with a system of electric distribution operated by alternate, intermittent, or pulsatory electric currents, of a storage-battery, means for charging the same by currents from the source of supply of said system, a rheotome for rendering discontinuous the currents from the battery, means for driving the same, and connections from the rheotome with said system, substantially as described.

3. The combination of a source of alternate electric currents, a system of secondary distribution operated by currents therefrom, a storage-battery, a converter for changing the potential of currents derived from the said generator, and a current-rectifier connected with the converter and delivering rectified currents to the storage-battery.

4. The combination, with a source of alternating, intermittent, or pulsatory electric currents and a work-circuit supplied therefrom, of a storage-battery, a current-rectifier through which currents are delivered from said source to said battery, a system of secondary distribution operated by currents from the generator, and a rheotome for rendering pulsatory, intermittent, or alternating currents from said battery and delivering them to said system of distribution, said rheotome moving synchronously with said generator, substantially as described.

5. The combination, with a source of alternating, intermittent, or pulsatory electric currents and a work-circuit supplied therefrom, of a storage-battery, a current-rectifier through which currents are delivered from said source to said battery, a system of secondary distribution operated by currents from the generator, and means for connecting said storage-battery with the work-circuit through said rectifier.

In testimony whereof I have hereunto subscribed my name this 5th day of September, A. D. 1887.

HENRY M. BYLLESBY.

Witnesses:
W. D. UPTEGRAFF,
D. W. EDGECOMB.